US012592916B2

(12) United States Patent
Gibson

(10) Patent No.: US 12,592,916 B2
(45) Date of Patent: Mar. 31, 2026

(54) METHODS AND APPARATUS TO AUTHENTICATE COMPUTING DEVICES

(71) Applicant: Musarubra US LLC, San Jose, CA (US)

(72) Inventor: Wayne Helm Gibson, Crawley (GB)

(73) Assignee: Musarubra US LLC, San Jose, CA (US)

( * ) Notice: Subject to any disclaimer, the term of this patent is extended or adjusted under 35 U.S.C. 154(b) by 224 days.

(21) Appl. No.: 18/482,252

(22) Filed: Oct. 6, 2023

(65) Prior Publication Data

US 2025/0119416 A1      Apr. 10, 2025

(51) Int. Cl.
*H04L 9/40*              (2022.01)

(52) U.S. Cl.
CPC ...... *H04L 63/0807* (2013.01); *H04L 63/0838* (2013.01); *H04L 63/101* (2013.01)

(58) Field of Classification Search
CPC ............. H04L 63/0807; H04L 63/0838; H04L 63/101
See application file for complete search history.

(56) References Cited

U.S. PATENT DOCUMENTS

| | | | | |
|---|---|---|---|---|
| 11,212,308 B1 * | 12/2021 | Kantor | ..................... | H04L 67/52 |
| 2015/0213255 A1 * | 7/2015 | Lev | ......................... | G06F 21/82 |
| | | | | 726/19 |

| | | | | |
|---|---|---|---|---|
| 2016/0119324 A1 * | 4/2016 | Kaladgi | .................. | G06F 21/41 |
| | | | | 726/8 |
| 2017/0249189 A1 * | 8/2017 | Milojicic | ................ | G06F 11/26 |
| 2018/0332016 A1 * | 11/2018 | Pandey | .............. | H04L 63/0428 |
| 2021/0092106 A1 * | 3/2021 | Hau | ........................ | H04L 63/08 |
| 2021/0282012 A1 * | 9/2021 | Lee | ........................ | H04M 15/61 |
| 2022/0113978 A1 * | 4/2022 | Poornachandran | ... | G06F 9/3877 |
| 2024/0134707 A1 * | 4/2024 | Poornachandran | ... | G06F 9/3877 |

* cited by examiner

*Primary Examiner* — Yonas A Bayou

(74) *Attorney, Agent, or Firm* — Hanley, Flight & Zimmerman, LLC

(57)                ABSTRACT

Systems, apparatus, articles of manufacture, and methods are disclosed to authenticate computing devices. An example apparatus includes interface circuitry, machine readable instructions, and programmable circuitry to at least one of instantiate or execute the machine readable instructions to access, via an application providing an online resource, a message requesting access to the online resource, the message including a device Internet Protocol (IP) address corresponding to a computing device transmitting the message, extract a log of IP addresses from a token generated by an authentication server, compare the device IP address to the log of IP addresses, and when the device IP address matches at least one of the IP addresses in the log, transmit the token to the application providing the online resource, the token authorizing the computing device to access the online resource.

15 Claims, 10 Drawing Sheets

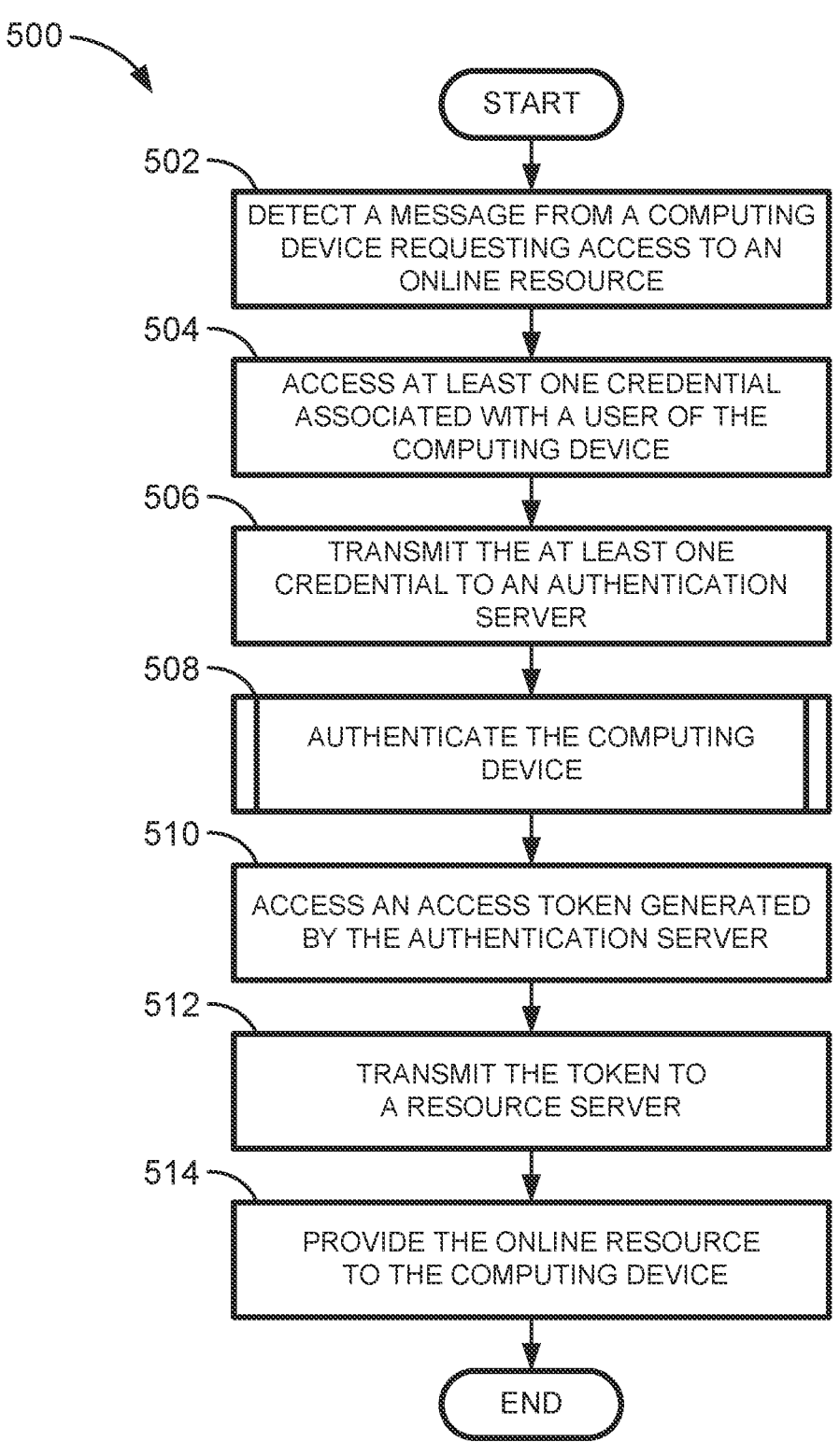

500

START

502 — DETECT A MESSAGE FROM A COMPUTING DEVICE REQUESTING ACCESS TO AN ONLINE RESOURCE

504 — ACCESS AT LEAST ONE CREDENTIAL ASSOCIATED WITH A USER OF THE COMPUTING DEVICE

506 — TRANSMIT THE AT LEAST ONE CREDENTIAL TO AN AUTHENTICATION SERVER

508 — AUTHENTICATE THE COMPUTING DEVICE

510 — ACCESS AN ACCESS TOKEN GENERATED BY THE AUTHENTICATION SERVER

512 — TRANSMIT THE TOKEN TO A RESOURCE SERVER

514 — PROVIDE THE ONLINE RESOURCE TO THE COMPUTING DEVICE

END

FIG. 5

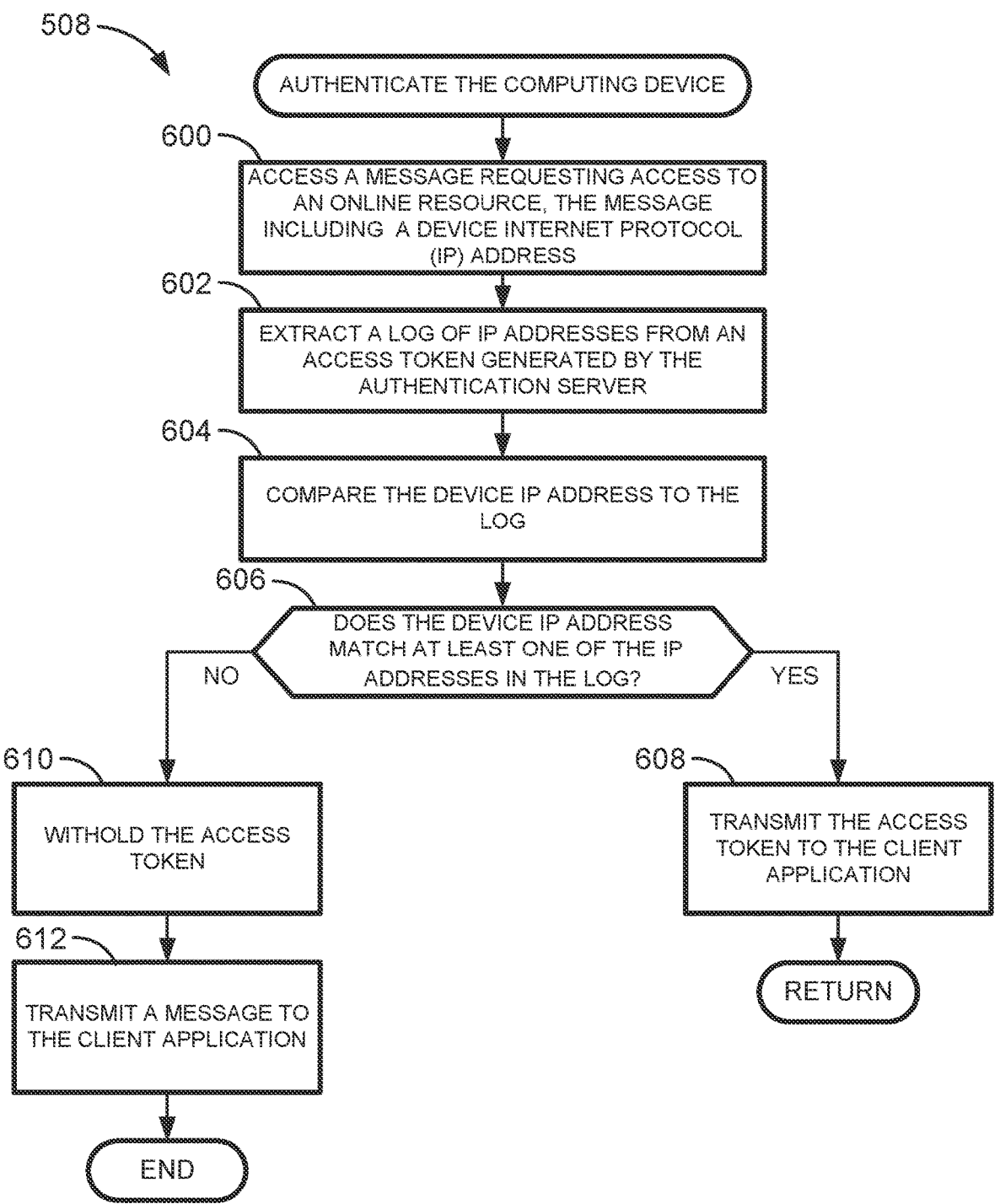

508

AUTHENTICATE THE COMPUTING DEVICE

600 — ACCESS A MESSAGE REQUESTING ACCESS TO AN ONLINE RESOURCE, THE MESSAGE INCLUDING A DEVICE INTERNET PROTOCOL (IP) ADDRESS

602 — EXTRACT A LOG OF IP ADDRESSES FROM AN ACCESS TOKEN GENERATED BY THE AUTHENTICATION SERVER

604 — COMPARE THE DEVICE IP ADDRESS TO THE LOG

606 — DOES THE DEVICE IP ADDRESS MATCH AT LEAST ONE OF THE IP ADDRESSES IN THE LOG?

NO                                    YES

610 — WITHOLD THE ACCESS TOKEN

608 — TRANSMIT THE ACCESS TOKEN TO THE CLIENT APPLICATION

612 — TRANSMIT A MESSAGE TO THE CLIENT APPLICATION

RETURN

END

FIG. 6

METHODS AND APPARATUS TO AUTHENTICATE COMPUTING DEVICES

FIELD OF THE DISCLOSURE

This disclosure relates generally to user authentication and, more particularly, to methods and apparatus to authenticate computing devices.

BACKGROUND

Online authentication systems increase the probability that a user requesting access to an online service is presenting accurate identity authentication information. In some examples, authentication systems may require a user to enter a username and password, as well as pass an additional identification test specified by the online service provider.

BRIEF DESCRIPTION OF THE DRAWINGS

FIGS. 5-6 are flowcharts representative of example machine readable instructions and/or example operations that may be executed, instantiated, and/or performed by example programmable circuitry to implement the permissions controller circuitry 102 of FIG. 2.

Figure 1:
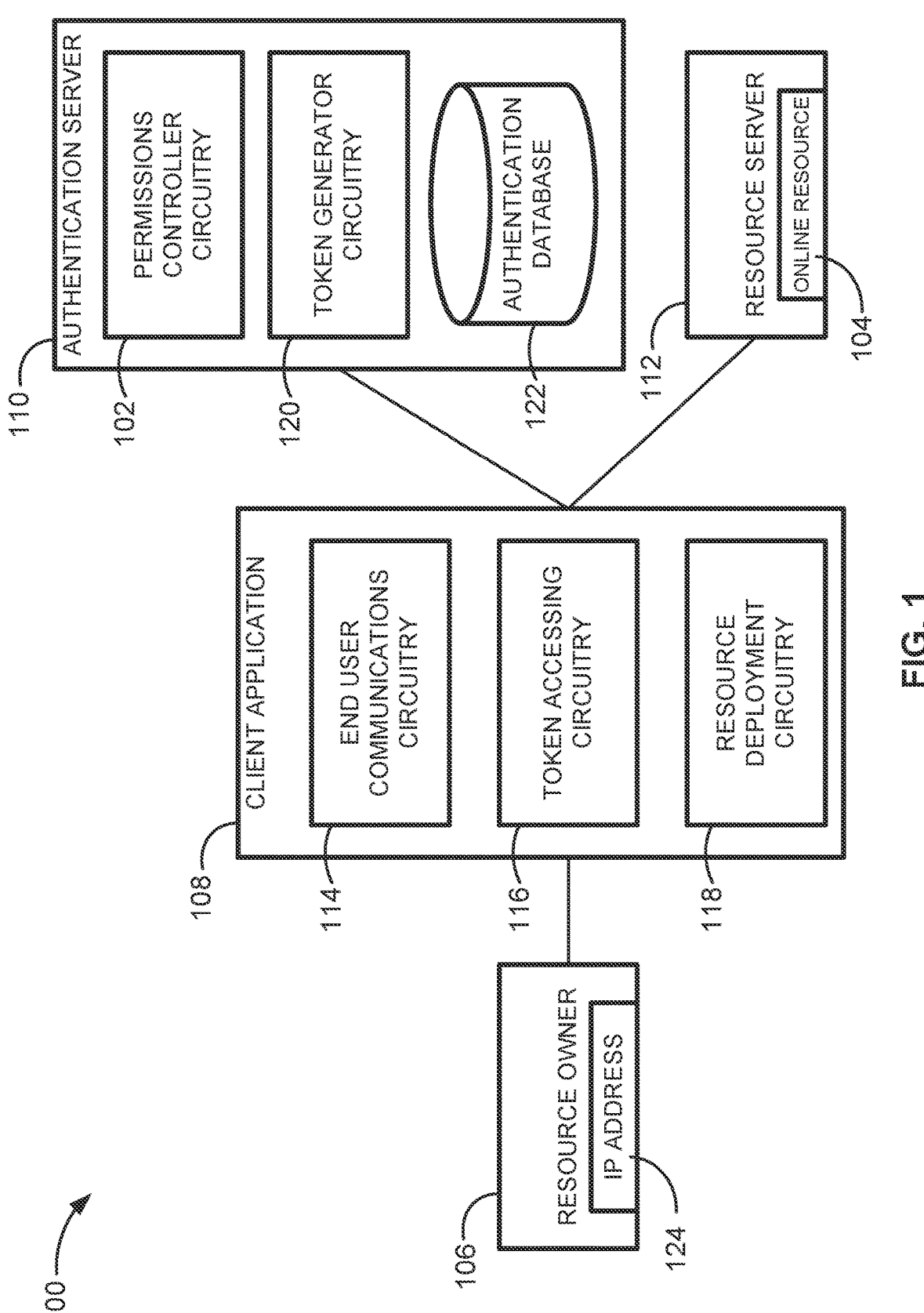
FIG. 1 is a block diagram of an example authentication system in which example permissions controller circuitry can be implemented.

In general, the same reference numbers will be used throughout the drawing(s) and accompanying written description to refer to the same or like parts. The figures are not necessarily to scale. Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

DETAILED DESCRIPTION

Methods and apparatus to authenticate computing devices are disclosed. Open Authorization (OAuth) is an authorization system that enables an end user's account information to be used by third-party services without exposing the user's credentials to the third-party. OAuth acts as an intermediary on behalf of the end user, providing the third-party service with an access token that authorizes specific end user account information (e.g., files, emails, contacts, etc.) to be shared. The third-party service receives the access token, but not the user credentials. As such, the user credentials are protected from hackers, malware, etc.

Organizations (e.g., employers, universities, etc.) desire to protect their cloud-based services (e.g., web servers, cloud-based file servers, email servers, etc.) from invalid end users (e.g., non-employees) and unauthorized devices. OAuth systems can function as the intermediary on behalf of employees. For example, an employee may want to access their information (e.g., emails) stored in an online resource (e.g., an email server) from a client application (e.g., web browser, mobile app, etc.). An example OAuth system can enable the employee to access their information from the online resource without giving their login information to the client application.

Examples disclosed herein verify user devices requesting access to online resources that are monitored by an example authentication server. Disclosed examples can access device identifiers (e.g., an Internet Protocol (IP) address) to determine whether the device is authorized or unauthorized. For example, examples disclosed herein can obtain these device identifiers from user requests (e.g., Hypertext Transfer Protocol (HTTP) requests) to access the online resources. Examples disclosed herein can compare these device identifiers to an example log of IP addresses, wherein the log denotes IP addresses (and users) that are permitted to access the online resources. For example, when a user transmits a request to access an online resource and the device identifier associated with the request matches at least one of the IP addresses denoted by the example log, then the computing device may be authenticated to access the online resource.

Further, disclosed examples can determine that an example computing device is unauthorized to access an online resource. For example, an example unauthorized user (e.g., malicious user, hacker, bad actor, etc.) may attempt to gain access to confidential information (e.g., user credentials, user information, etc.) from the online resource. Disclosed examples can identify such unauthorized users when the device identifier associated with the access request does not match an IP address denoted by the example log. As such, disclosed examples enable secure transmissions of user credentials and confidential information between an end user and a client application.

FIG. 1 is a block diagram of an example authentication system 100 in which example permissions controller circuitry 102 operates to grant access to an example online resource 104 in accordance with the teachings of this disclosure. The example authentication system 100 includes an example resource owner 106, an example client application 108, an example authentication server 110, and an example resource server 112 that operates the example online resource 104. The client application 108 includes example end user communications circuitry 114, example token accessing circuitry 116, and example resource deployment circuitry 118. Examples disclosed herein are described with respect to an example OAuth system. However, examples disclosed herein may be implemented in any authentication system.

The resource owner 106 owns the data (e.g., files, pictures, emails, etc.) that resides in the online resource 104. The example resource owner 106 can be an end user (e.g., employee, student, etc.) who requests access to the online resource 104 (e.g., Microsoft 365). To do so, the resource owner 106 uses the client application 108 (e.g., Google web browser, Yahoo web browser, mobile app, etc.) on an example device and navigates to the online resource 104. For example, the resource owner 106 causes the client application 108 to transmit a HTTP request requesting access to the online resource 104. Before the client application 108 can display/access the online resource 104, the end user communications circuitry 114 prompts the resource owner 106 to enter user credentials (e.g., username and password). Then, the client application 108 transmits the user credentials to the authentication server 110.

The example authentication server 110 is an OAuth server that includes example token generator circuitry 120, an example authentication database 122, and the example permissions controller circuitry 102. The example authentication server 110 may be implemented by one or more servers and/or cloud services to provide authentication information associated with queries from resource owners (e.g., the resource owner 106). The example token generator circuitry 120 generates an example access token (e.g., OAuth token) based on the user credentials. The example permissions controller circuitry 102 accesses the access token and determines whether to transmit the access token to the client application 108, described in detail in connection with FIG. 2.

In some examples, the token accessing circuitry 116 accesses the token from the permissions controller circuitry 102. In other words, the authentication server 110 authenticates the request associated with the resource owner 106 by transmitting the token to the client application 108. As such, the resource deployment circuitry 118 requests the online resource 104 from the resource server 112 and provides the online resource 104 to the resource owner 106. Thus, the resource owner 106 can access the data in the online resource 104.

In some examples, the authentication server 110 may reject (e.g., unauthorize, limit, etc.) a request to access the online resource 104. In particular, the example permissions controller circuitry 102 may withhold the access token based on an identifier (e.g., an example IP address 124) of the example device associated with the request (e.g., the HTTP request). For example, an unauthorized user may attempt to gain access to the online resource 104. The example permissions controller circuitry 102 can identify the unauthorized user because the device identifier associated with the request may not match the device identifier associated with the resource owner 106.

Figure 2:
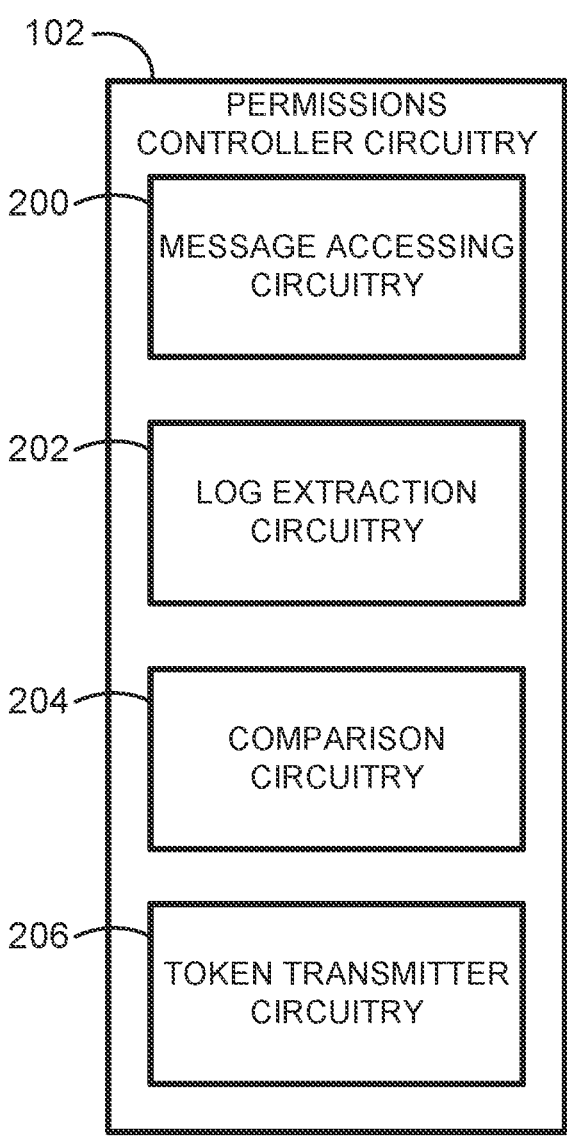
FIG. 2 is a block diagram of an example implementation of the example permissions controller circuitry of FIG. 1.

FIG. 2 is a block diagram of an example implementation of the permissions controller circuitry 102 of FIG. 1 to authenticate devices. The example permissions controller circuitry 102 includes example message accessing circuitry 200, example log extraction circuitry 202, example comparison circuitry 204, and example token transmitter circuitry 206. The permissions controller circuitry 102 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the permissions controller circuitry 102 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

The example message accessing circuitry 200 accesses (e.g., obtains) an example request for access to the online resource 104 . . . . In some examples, the resource owner 106 transmits an HTTP request for the online resource 104 from an example device (e.g., smartphone, tablet, desktop computer, laptop computer, etc.) to the client application 108 (e.g., a web browser). Accordingly, the message accessing circuitry 200 can access the example HTTP request from the client application 108. The example request includes a device identifier (e.g., the IP address 124) associated with the computing device that the resource owner 106 uses to transmit the request. As such, the example message accessing circuitry 200 can access the IP address 124. In some examples, the message accessing circuitry 200 is instantiated by programmable circuitry executing message accessing instructions and/or configured to perform operations such as those represented by the flowchart(s) of FIGS. 5 and 6.

In some examples, the permissions controller circuitry 102 includes means for accessing a message. For example, the means for accessing may be implemented by message accessing circuitry 200. In some examples, the message accessing circuitry 200 may be instantiated by programmable circuitry such as the example programmable circuitry 712 of FIG. 7. For instance, the message accessing circuitry 200 may be instantiated by the example microprocessor 800 of FIG. 8 executing machine executable instructions such as those implemented by at least block 600 of FIG. 6. In some examples, the message accessing circuitry 200 may be instantiated by hardware logic circuitry, which may be implemented by an ASIC, XPU, or the FPGA circuitry 900 of FIG. 9 configured and/or structured to perform operations corresponding to the machine readable instructions. Additionally or alternatively, the message accessing circuitry 200 may be instantiated by any other combination of hardware, software, and/or firmware. For example, the message accessing circuitry 200 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example log extraction circuitry 202 extracts (e.g., obtains, accesses, etc.) a log of example IP addresses from an example access token. In some examples, the access token includes claims (e.g., strings of code) that identify the resource owner 106. For example, the access token can include claims that identify or verify a resource owner 106 by name, preferred name, profile, gender, birthday, etc. In some examples, the authentication server 110 (or the token generator circuitry 120) can generate the access token to include a log of IP addresses, wherein the log of IP addresses denote authorized IP addresses. In other words, the authentication server 110 can embed a log of IP addresses that are authorized for access to the online resource 104 within the access token. Accordingly, the example log extraction circuitry 202 extracts the log of IP addresses. As used herein, a "log of IP addresses" can refer to a list, a set, a group, a range, etc., of IP addresses or other device identifiers. For example, a "log of IP addresses" can refer to a Classless Inter-Domain Routing (CIDR) notation of IP addresses that defines an IP range. In some examples, the log extraction circuitry 202 is instantiated by programmable circuitry executing log extraction instructions and/or configured to perform operations such as those represented by the flowchart(s) of FIGS. 5 and 6.

In some examples, the permissions controller circuitry 102 includes means for extracting a log. For example, the means for extracting may be implemented by log extraction circuitry 202. In some examples, the log extraction circuitry 202 may be instantiated by programmable circuitry such as the example programmable circuitry 712 of FIG. 7. For instance, the log extraction circuitry 202 may be instantiated by the example microprocessor 800 of FIG. 8 executing machine executable instructions such as those implemented by at least block 602 of FIG. 6. In some examples, the log extraction circuitry 202 may be instantiated by hardware logic circuitry, which may be implemented by an ASIC, XPU, or the FPGA circuitry 900 of FIG. 9 configured and/or structured to perform operations corresponding to the machine readable instructions. Additionally or alternatively, the log extraction circuitry 202 may be instantiated by any other combination of hardware, software, and/or firmware. For example, the log extraction circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example comparison circuitry 204 compares the IP address 124 to the log of IP addresses. In some examples, the comparison circuitry 204 compares the IP address 124 to the CIDR notation that represents the log of IP addresses. For example, the log of IP addresses can be represented as 198.51.100.0/22 (an example CIDR notation) which, in turn, represents the IP addresses in a range from 198.51.100.0 to 198.51.103.255 (e.g., 198.51.100.0, 198.51.100.1, 198.51.100.2, etc.). The example comparison circuitry 204 can compare the log of IP addresses (198.51.100.0/22) to the IP address 124 (e.g., 198.51.100.1). In this example, the comparison circuitry 204 can determine that the IP address 124 (198.51.100.1) is greater than 198.51.100.0 (e.g., a first example reference IP address in the CIDR notation) and less than 198.51.103.255 (e.g., a second example reference IP address in the CIDR notation). In other words, the comparison circuitry 204 can determine that the first reference IP address sequentially precedes the IP address 124 and, further, that the second reference IP address sequentially follows the IP address 124. As such, the comparison circuitry 204 can determine that the IP address 124 matches at least one of the IP addresses in the log. In some examples, the comparison circuitry 204 can determine that the IP address 124 does not match at least one of the IP addresses in the log. For example, if the log of IP addresses is represented as 198.51.100.0/22 and the IP address 124 is 192.168.1.1, then the IP address 124 does not match at least one of the IP addresses in the log. In particular, the IP address 124

(192.168.1.1) is outside of the range (198.51.100.0 to 198.51.103.255) represented by the log (198.51.100.0/22).

In some examples, the comparison circuitry 204 can compare the IP address 124 to the log of IP addresses after the access token expires. In some examples, the access token includes a claim that defines an expiration date/time and/or a period of time the access code may be valid (e.g., one hour, one week, etc.). The resource owner 106 may re-request the online resource 104 by re-entering the HTTP request at the client application 108. As such, the token generator circuitry 120 re-generates a second access token different from the initial access token, wherein the second access token includes a claim with the log of IP addresses. The comparison circuitry 204 compares (e.g., re-checks) the IP address 124 to the log of IP addresses. If the IP address 124 and/or the log of IP addresses has changed, then the comparison circuitry 204 can determine that the IP address 124 does not match at least one of the IP addresses in the log. Thus, if the resource owner 106 (or a hacker) attempts to access the online resource 104 from a different device (or unauthorized device) after the access token has expired, the comparison circuitry 204 can determine that the IP address 124 is not on the list of authorized devices determined by the log. In some examples, the comparison circuitry 204 is instantiated by programmable circuitry executing comparing instructions and/or configured to perform operations such as those represented by the flowchart(s) of FIGS. 5 and 6.

In some examples, the permissions controller circuitry 102 includes means for comparing. For example, the means for comparing may be implemented by comparison circuitry 204. In some examples, the comparison circuitry 204 may be instantiated by programmable circuitry such as the example programmable circuitry 712 of FIG. 7. For instance, the comparison circuitry 204 may be instantiated by the example microprocessor 800 of FIG. 8 executing machine executable instructions such as those implemented by at least blocks 604 and 606 of FIG. 6. In some examples, the comparison circuitry 204 may be instantiated by hardware logic circuitry, which may be implemented by an ASIC, XPU, or the FPGA circuitry 900 of FIG. 9 configured and/or structured to perform operations corresponding to the machine readable instructions. Additionally or alternatively, the comparison circuitry 204 may be instantiated by any other combination of hardware, software, and/or firmware. For example, the comparison circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example token transmitter circuitry 206 transmits the access token when the IP address 124 matches at least one of the IP addresses in the log. In particular, the example token transmitter circuitry 206 transmits the access token to the client application 108. As such, the device associated with the IP address 124 (e.g., the device that the resource owner 106 used to send the request) is authorized to access the online resource 104 upon the client application 108 accessing the token. Further, the resource owner 106 may access the online resource 104 on the authorized device. In some examples, the token transmitter circuitry 206 withholds (e.g., does not transmit, limits, etc.) the access token from the client application 108. For example, when the IP address 124 does not match (e.g., is different from) any of the IP addresses in the log, then the token transmitter circuitry 206 withholds the access token. As a result, the device associated with the IP address is not authorized to access the online resource 104. Further, the resource owner 106 may be prevented from accessing the online resource 104. In some examples, the token transmitter circuitry 206 is instantiated by programmable circuitry executing transmitting instructions and/or configured to perform operations such as those represented by the flowchart(s) of FIGS. 5 and 6.

In some examples, the permissions controller circuitry 102 includes means for transmitting. For example, the means for transmitting may be implemented by token transmitter circuitry 206. In some examples, the token transmitter circuitry 206 may be instantiated by programmable circuitry such as the example programmable circuitry 712 of FIG. 7. For instance, the token transmitter circuitry 206 may be instantiated by the example microprocessor 800 of FIG. 8 executing machine executable instructions such as those implemented by at least blocks 608 and 610 of FIG. 6. In some examples, the token transmitter circuitry 206 may be instantiated by hardware logic circuitry, which may be implemented by an ASIC, XPU, or the FPGA circuitry 900 of FIG. 9 configured and/or structured to perform operations corresponding to the machine readable instructions. Additionally or alternatively, the token transmitter circuitry 206 may be instantiated by any other combination of hardware, software, and/or firmware. For example, the token transmitter circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

Figure 3:
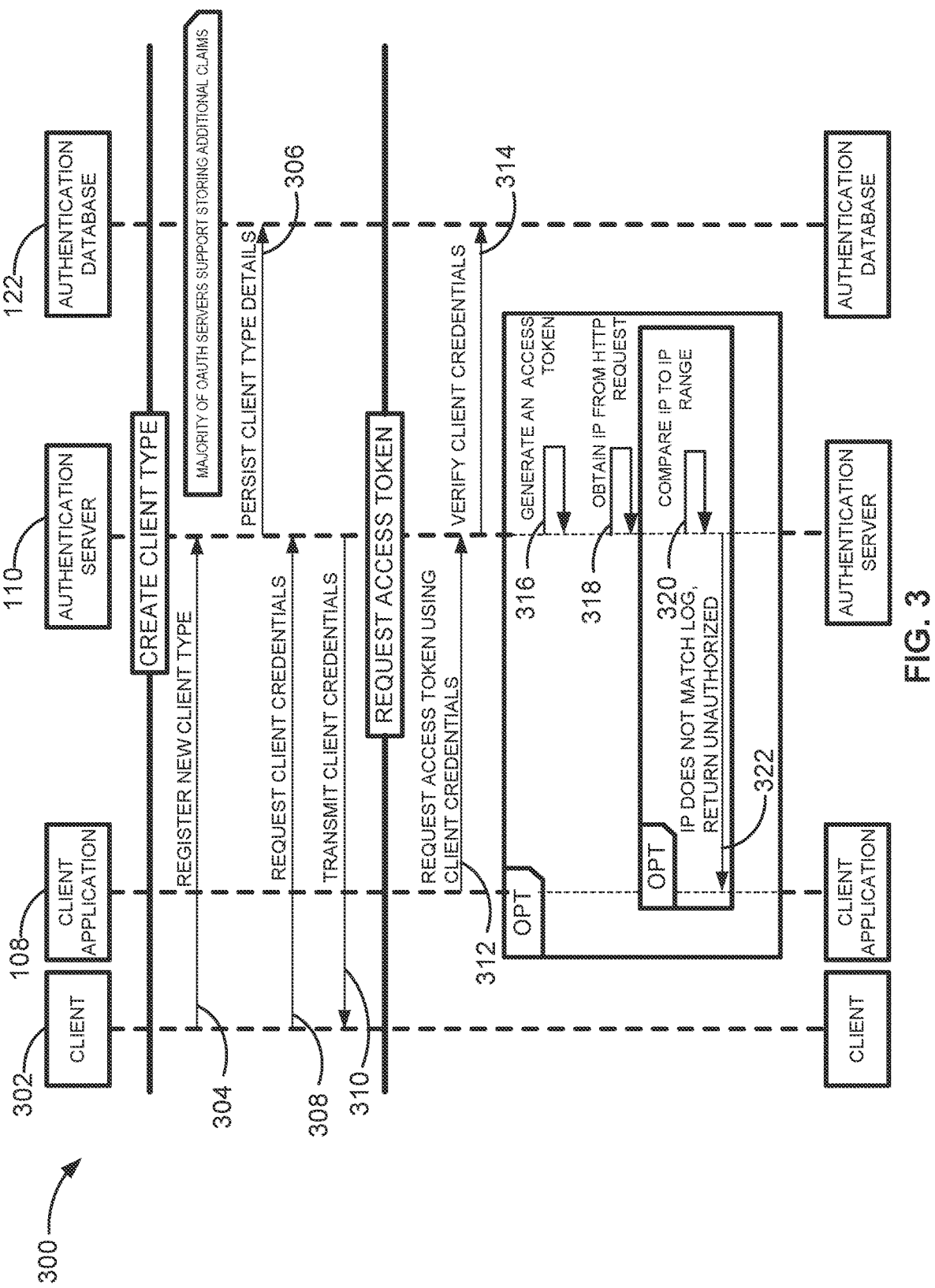
FIG. 3 is an example sequence showing an example process to authenticate a computing device in accordance with teachings of this disclosure.

FIG. 3 is an example sequence 300 illustrating an example sequence of requests that may be exchanged among the authentication server 110, the client application 108, an example client 302, and an example authentication database 122. The example sequence 300 begins at arrow 304 as the client 302 registers with the authentication server 110. The example client 302 (e.g., the entity operating the client application 108) registers the client application 108 with an authentication service associated with the authentication server 110. To do so, the client 302 provides information (e.g., application name, an icon for the application, a uniform resource locator (URL) to the application home page, etc.) to the authentication server 110. Further, the client 302 can transmit an example log of IP addresses (e.g., a log of authorized IP addresses) to the authentication server 110. Accordingly, the token generator circuitry 120 generates access tokens including claims that include the log of IP addresses. At arrow 306, the authentication server 110 stores (e.g., saves, persists, etc.) the client type, the information associated with the client 302, information associated with the client application 108, the log of IP addresses, etc., in the authentication database 122.

At arrow 308, the client 302 requests client credentials (e.g., an example client_id and an example secret) from the authentication server 110. At arrow 310, the authentication server 110 transmits the client credentials to the client 302. The client 302 can use the client credentials when communicating with the authentication server 110. For example, when the client application 108 receives an HTTP request from the resource owner 106, then the client 302 can use the client credentials to ensure secure transmissions between the client 302 and the authentication server 110.

At arrow 312, the client application 108 requests an access token from the authentication server 110 using the client credentials (e.g., the client_id and secret). In some examples, the client application 108 requests an access token in response to an HTTP request from the resource owner 106 requesting access to the online resource 104. For example, the client application 108 may need an access token to permit the resource owner 106 access to the online resource 104.

At arrow 314, the authentication server 110 verifies that the client credentials provided by the client application 108 match the client credentials that the authentication server 110 issued to the client 302 (arrow 312). In other words, the authentication server 110 validates the client credentials. In this example, the client credentials that the authentication server 110 issued to the client 302 are stored in the authentication database 122.

At arrow 316, the example token generator circuitry 120 generates an access token when the authentication server 110 determines that the client credentials are valid. Further, the token generator circuitry 120 generates the access token to include the log of authorized IP addresses.

At arrow 318, the example message accessing circuitry 200 obtains the IP address 124 from the HTTP request that requested access to the online resource 104. At arrow 320, the example comparison circuitry 204 compares the IP address 124 to the log of IP addresses. In particular, the comparison circuitry 204 determines whether the IP address 124 matches at least one of the IP addresses in the log of IP addresses. At arrow 322, in response to the comparison circuitry 204 determining that the IP address 124 does not match any of the IP addresses in the log of IP addresses, the token transmitter circuitry 206 returns the request as "unauthorized." However, any other type of response message that does not provide a token may additionally or alternatively be used. In this manner, the token transmitter circuitry 206 withholds the access token. Then, the sequence 300 ends.

Alternatively, the token transmitter circuitry 206 may transmit the access token to the client application 108. For example, the comparison circuitry 204 can determine that the IP address 124 matches at least one of the IP addresses in the log. In this manner, the token transmitter circuitry 206 may transmit the request as "authorized."

Figure 4:
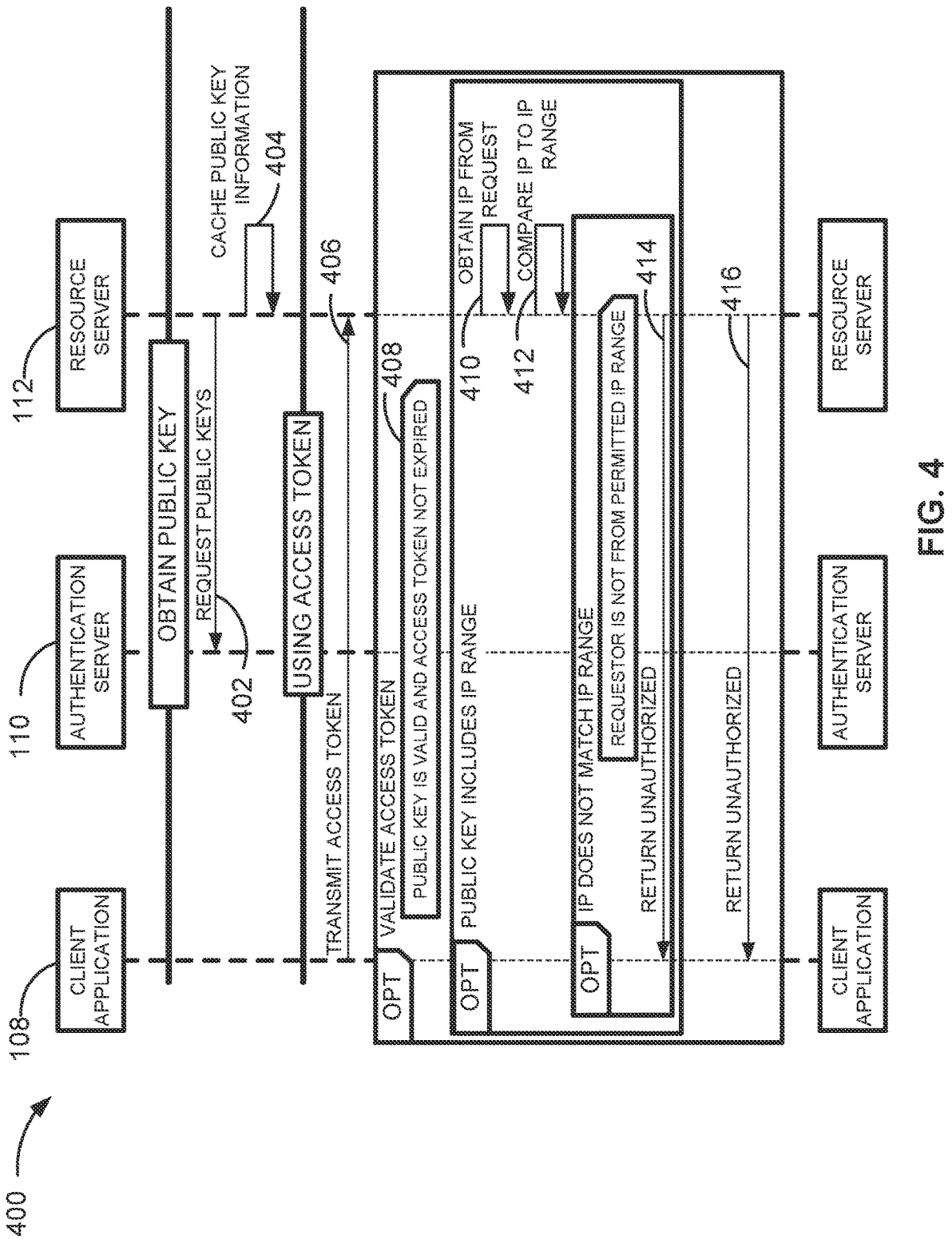
FIG. 4 is another example sequence showing an example process to authenticate a computing device in accordance with teachings of this disclosure.

FIG. 4 is an example sequence 400 illustrating an example sequence of requests that may be exchanged among the client application 108, the authentication server 110, and the resource server 112. The example sequence 400 of FIG. 4 is similar to the example sequence 300 of FIG. 3, but instead includes a public key that includes a log of IP addresses. In this example, the public keys are access keys that can be used to access the online resource 104 hosted by the resource server 112. For example, public keys can be made available (e.g., given, transmitted, etc.) to certain users (e.g., the resource owner 106) to access the online resource 104. In some examples, the resource owner 106 may use a public key to request and gain access to the online resource 104 instead of using user credentials to request and gain access to the online resource 104. The sequence 400 begins at arrow 402 as the authentication server 110 requests public keys from the resource server 112. The example resource server 112 generates public keys for the authentication server 110 to use and distribute to the resource owner 106. At arrow 404, the resource server 112 caches (e.g., stores) the public key information. In this example, the public key information includes the log of IP addresses (e.g., log of permitted IP addresses) associated with the online resource 104.

At arrow 406, the client application 108 transmits an example access token (e.g., OAuth token) including the public key information to the resource server 112. In this example, the client application 108 transmits the access token including the public key information in response to a request (e.g., HTTP request) from the resource owner 106 to access the online resource 104. At arrow 408, the resource server 112 determines whether the access token includes the valid public key information. Further, the authentication server 110 determines whether the access token is expired. In this example, the public key information included in the access token is valid and the access token is valid (e.g., not expired). As such, the sequence 400 proceeds to arrow 410, at which the resource server 112 obtains the IP address 124 from the request. At arrow 412, the resource server 112 compares the IP address 124 to the log of IP addresses (included in the public key information).

At arrow 414, in response to the resource server 112 determining that the IP address 124 does not match the log of IP addresses, the resource server 112 returns the request as "unauthorized." At arrow 416, the resource server 112 transmits a message to the client application 108, the message indicating that the request and the end user who requested the online resource 104 are unauthorized. However, any other type of response message that does not provide access to the online resource 104 may additionally or alternatively be used. In this manner, the end user may not have access to the online resource 104.

Alternatively, the resource server 112 may transmit a message indicating that the request and the end user who requested the online resource 104 are authorized. For example, the resource server 112 may determine that the IP address 124 matches at least one of the IP addresses in the log. In this manner, the end user may have access to the online resource 104.

While an example manner of implementing the permissions controller circuitry 102 of FIG. 1 is illustrated in FIG. 2, one or more of the elements, processes, and/or devices illustrated in FIG. 2 may be combined, divided, re-arranged, omitted, eliminated, and/or implemented in any other way. Further, the example message accessing circuitry 200, the example log extraction circuitry 202, the example comparison circuitry 204, and the example token transmitter circuitry 206, and/or, more generally, the example permissions controller circuitry 102 of FIG. 2, may be implemented by hardware alone or by hardware in combination with software and/or firmware. Thus, for example, any of the example message accessing circuitry 200, the example log extraction circuitry 202, the example comparison circuitry 204, and the example token transmitter circuitry 206, and/or, more generally, the example permissions controller circuitry 102, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example permissions controller circuitry 102 of FIG. 2 may include one or more elements, processes, and/or devices in addition to, or instead of, those illustrated in FIG. 2, and/or may include more than one of any or all of the illustrated elements, processes and devices.

Flowchart(s) representative of example machine readable instructions, which may be executed by programmable circuitry to implement and/or instantiate the permissions controller circuitry 102 of FIG. 2 and/or representative of example operations which may be performed by programmable circuitry to implement and/or instantiate the permissions controller circuitry 102 of FIG. 2, are shown in FIGS. 5 and 6. The machine readable instructions may be one or more executable programs or portion(s) of one or more executable programs for execution by programmable circuitry such as the programmable circuitry 712 shown in the example programmable circuitry platform 700 discussed below in connection with FIG. 7 and/or may be one or more function(s) or portion(s) of functions to be performed by the example programmable circuitry (e.g., an FPGA) discussed below in connection with FIGS. 8 and/or 9. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 5 and 6, many other methods of implementing the example permissions controller circuitry 102 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 5 and 6 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 5 is a flowchart representative of example machine readable instructions and/or example operations 500 that may be executed, instantiated, and/or performed by programmable circuitry to request access to the online resource 104. The example machine-readable instructions and/or the example operations 500 of FIG. 5 begin at block 502, at which the example end user communications circuitry 114 detects an example message (e.g., an HTTP request) from an example computing device requesting access to the online resource 104. In some examples, the resource owner 106 requests access to the online resource 104 via the example computing device.

At block 504, the example end user communications circuitry 114 accesses at least one credential (e.g., username and/or password) associated with a user (e.g., the resource owner 106) of the computing device. In some examples, the end user communications circuitry 1114 may prompt the user to enter the at least one credential using a login web page.

At block 506, the example end user communications circuitry 114 transmits the at least one credential to the authentication server 110. In some examples, the authentication server 110 can authenticate the request based on the at least one credential. For example, the authentication server 110 can prompt the token generator circuitry 120 to generate an access token when the authentication server 110 verifies the username and password of the user.

At block 508, the example permissions controller circuitry 102 authenticates the computing device, as described in detail in connection with FIG. 6. In some examples, the permissions controller circuitry 102 transmits a message to the client application 108, the message indicating that the computing device is "unauthorized" or "unauthenticated." Accordingly, the process may end. However, when the permissions controller circuitry 102 authenticates the computing device, the process may proceed to block 510.

At block 510, the example token accessing circuitry 116 accesses the access token (e.g., OAuth token) generated by (and transmitted from) the authentication server 110. In some examples, the access token is a string representing an authorization for the resource owner 106 to access the online resource 104.

At block 512, the example resource deployment circuitry 118 transmits the access token to the resource server 112. As such, the resource server 112 can provide (e.g., release) the online resource 104 to the client application 108.

At block 514, the example resource deployment circuitry 118 provides the online resource 104 to the resource owner 106 (and the authorized computing device) via the client application 108. Then, the process ends.

FIG. 6 is a flowchart representative of example machine readable instructions and/or example operations that may be executed, instantiated, and/or performed by programmable circuitry to implement the permissions controller circuitry 102, described above in connection with block 508 of FIG. 5. The example machine readable instructions and/or the operations of FIG. 6 begin at block 600, at which the example message accessing circuitry 200 accesses the example message (e.g., the HTTP request) requesting access to the online resource 104. The example HTTP request includes the IP address 124 associated with the example computing device that the resource owner 106 used to request access to the online resource 104.

At block 602, the example log extraction circuitry 202 extracts a log of example IP addresses from an example access token. In some examples, the authentication server 110 (or the token generator circuitry 120) can generate the access token to include a log of IP addresses, wherein the log of IP addresses denote authorized IP addresses. In other words, the authentication server 110 can embed the access token with a log of IP addresses that are authorized for access to the online resource 104. Accordingly, the example log extraction circuitry 202 extracts the log of IP addresses.

At block 604, the example comparison circuitry 204 compares the IP address 124 to the log of IP addresses. In some examples, the comparison circuitry 204 compares the IP address 124 to a CIDR notation that represents the log of IP addresses. For example, the log of IP addresses can be represented as 198.51.100.0/22 (an example CIDR notation) which, in turn, represents the IP addresses in a range from 198.51.100.0 to 198.51.103.255 (e.g., 198.51.100.0, 198.51.100.1, 198.51.100.2, etc.). The example comparison circuitry 204 can compare the log of IP addresses (198.51.100.0/22) to the IP address 124 (e.g., 198.51.100.1).

At block 606, the example comparison circuitry 204 determines whether the IP address 124 matches at least one of the IP addresses in the log. For example, the comparison circuitry 204 can determine that the IP address 124 (198.51.100.1) is greater than 198.51.100.0 (e.g., a first example reference IP address in the CIDR notation) and less than 198.51.103.255 (e.g., a second example reference IP address in the CIDR notation). As such, the comparison circuitry 204 can determine that the IP address 124 matches at least one of the IP addresses in the log and the process proceeds to block 608. Otherwise, the comparison circuitry 204 can determine that the IP address 124 does not match at least one of the IP addresses in the log. For example, if the log of IP addresses is represented as 198.51.100.0/22 and the IP address 124 is 192.168.1.1, then the IP address 124 does not match at least one of the IP addresses in the log. In particular, the IP address 124 (192.168.1.1) is outside of the range (198.51.100.0 to 198.51.103.255) represented by the log (198.51.100.0/22), and the process proceeds to block 610.

At block 608, the example token transmitter circuitry 206 transmits the access token when the IP address 124 matches at least one of the IP addresses in the log. In particular, the example token transmitter circuitry 206 transmits the access token to the client application 108. As such, the device associated with the IP address 124 (e.g., the device that the resource owner 106 used to send the request) is authorized to access the online resource 104 upon the client application 108 accessing the token. Then, control of the process returns to FIG. 5.

At block 610, the example token transmitter circuitry 206 withholds the access token from the client application 108. As such, the device associated with the IP address is not authorized to access the online resource 104. Further, the resource owner 106 may be prevented from accessing the online resource 104.

At block 612, the example token transmitter circuitry 206 transmits a message to the client application 108. In some examples, the token transmitter circuitry 206 transmits a message indicating that the request, the end user, the computing device, etc., are "unauthorized" or "unauthenticated." Then, the process ends.

Figure 7:
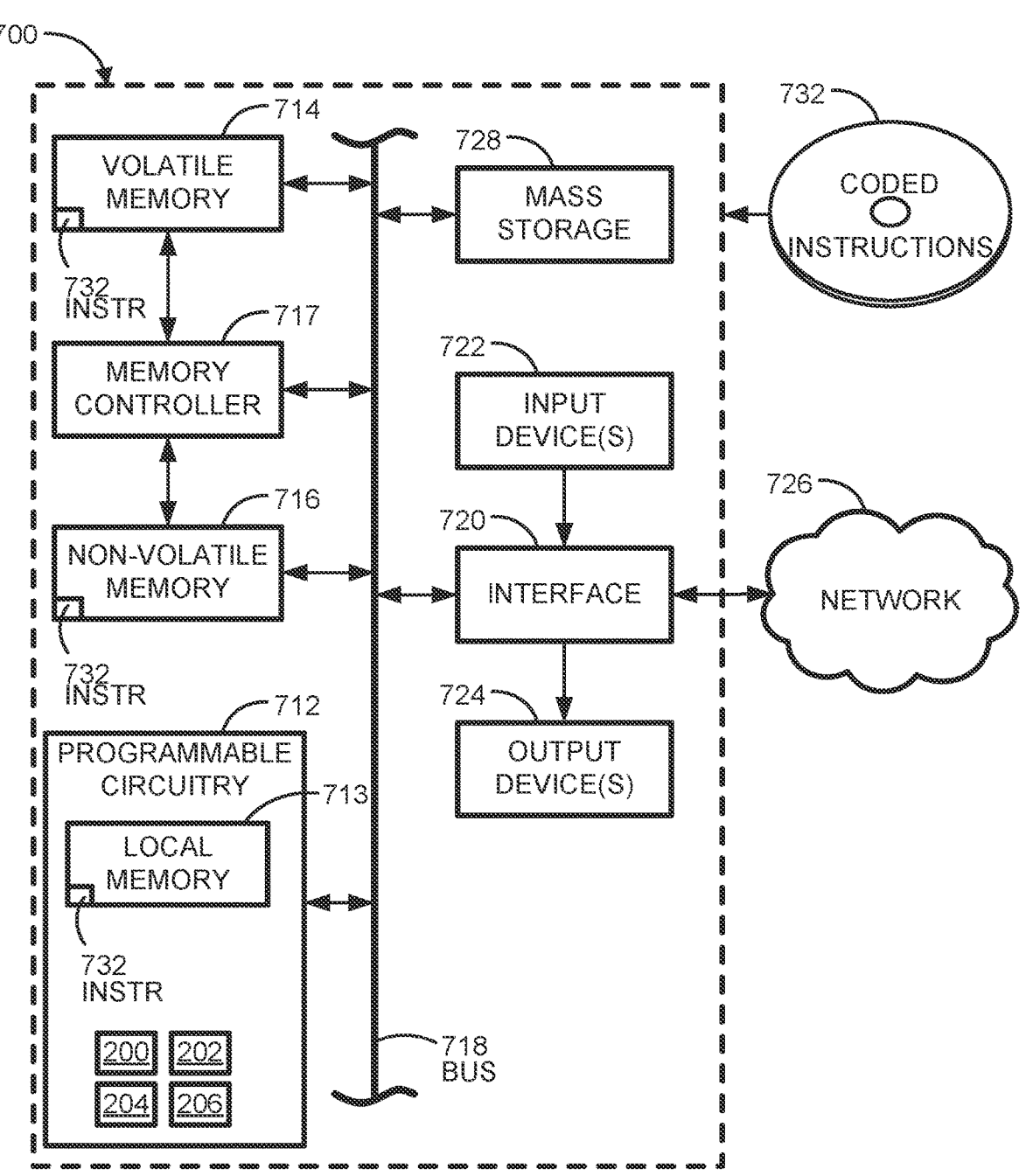
FIG. 7 is a block diagram of an example processing platform including programmable circuitry structured to execute, instantiate, and/or perform the example machine readable instructions and/or perform the example operations of FIGS. 5 and 6 to implement the permissions controller circuitry 102 of FIG. 2.

FIG. 7 is a block diagram of an example programmable circuitry platform 700 structured to execute and/or instantiate the example machine-readable instructions and/or the example operations of FIGS. 5 and 6 to implement the permissions controller circuitry 102 of FIG. 2. The programmable circuitry platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 700 of the illustrated example includes programmable circuitry 712. The programmable circuitry 712 of the illustrated example is hardware. For example, the programmable circuitry 712 can be implemented by one or more integrated circuits, logic circuits, FPGAs, microprocessors, CPUs, GPUs, DSPs, and/or microcontrollers from any desired family or manufacturer. The programmable circuitry 712 may be implemented by one or more semiconductor based (e.g., silicon based) devices. In this example, the programmable circuitry 712 implements the example message accessing circuitry 200, the example log extraction circuitry 202, the example comparison circuitry 204, and the example token transmitter circuitry 206.

The programmable circuitry 712 of the illustrated example includes a local memory 713 (e.g., a cache, registers, etc.). The programmable circuitry 712 of the illustrated example is in communication with main memory 714, 716, which includes a volatile memory 714 and a non-volatile memory 716, by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717. In some examples, the memory controller 717 may be implemented by one or more integrated circuits, logic circuits, microcontrollers from any desired family or manufacturer, or any other type of circuitry to manage the flow of data going to and from the main memory 714, 716.

The programmable circuitry platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user (e.g., a human user, a machine user, etc.) to enter data and/or commands into the programmable circuitry 712. The input device(s) 722 can be implemented by, for example, an audio sensor, a microphone, a camera (still or video), a keyboard, a button, a mouse, a touchscreen, a trackpad, a trackball, an isopoint device, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 700 of the illustrated example also includes one or more mass storage discs or devices 728 to store firmware, software, and/or data. Examples of such mass storage discs or devices 728 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 732, which may be implemented by the machine readable instructions of FIGS. 5 and 6, may be stored in the mass storage device 728, in the volatile memory 714, in the non-volatile memory 716, and/or on at least one non-transitory computer readable storage medium such as a CD or DVD which may be removable.

Figure 8:
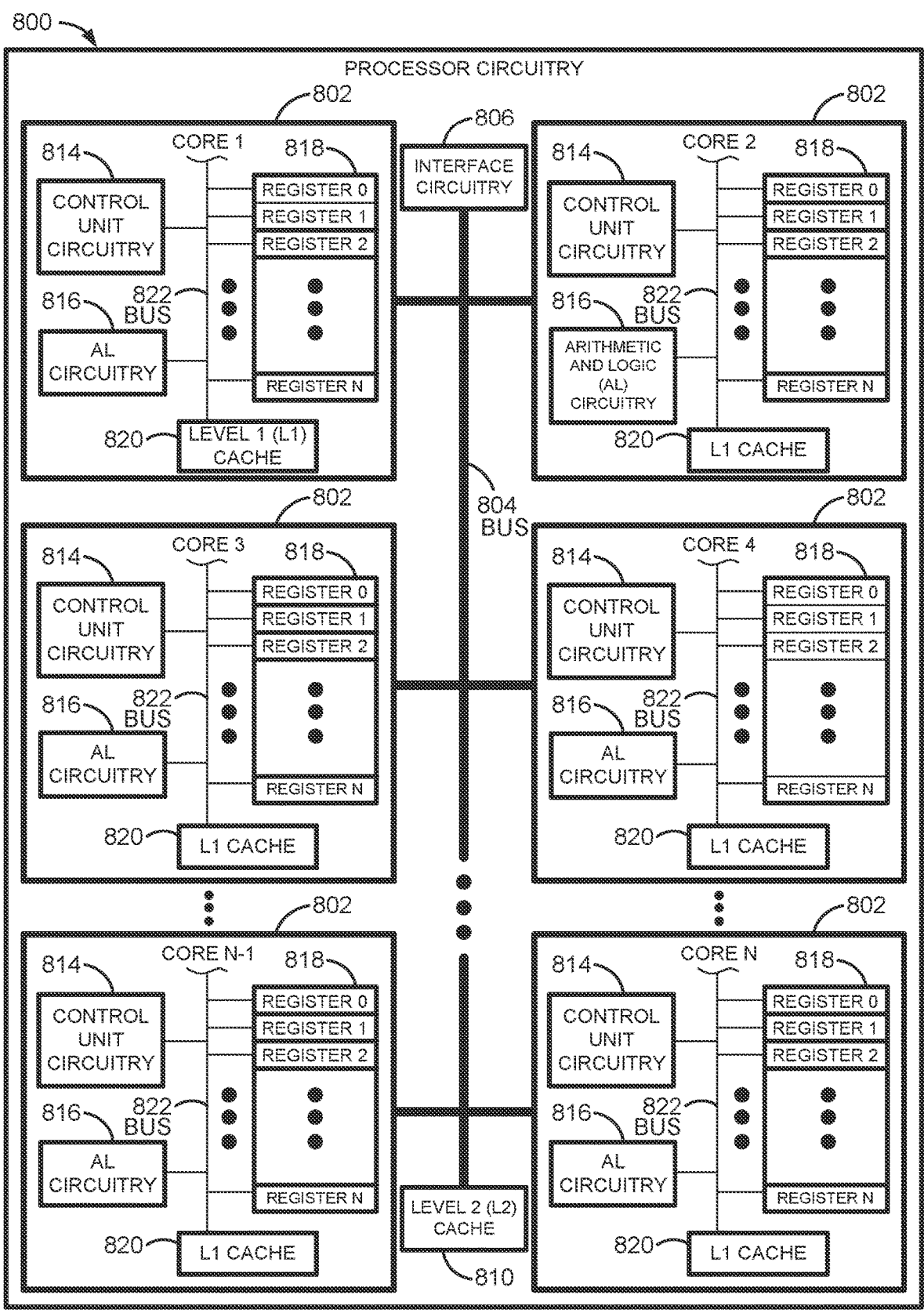
FIG. 8 is a block diagram of an example implementation of the programmable circuitry of FIG. 7.

FIG. 8 is a block diagram of an example implementation of the programmable circuitry 712 of FIG. 7. In this example, the programmable circuitry 712 of FIG. 7 is implemented by a microprocessor 800. For example, the microprocessor 800 may be a general-purpose microprocessor (e.g., general-purpose microprocessor circuitry). The microprocessor 800 executes some or all of the machine-readable instructions of the flowcharts of FIGS. 5 and 6 to effectively instantiate the circuitry of FIG. 2 as logic circuits to perform operations corresponding to those machine readable instructions. In some such examples, the circuitry of FIG. 2 is instantiated by the hardware circuits of the microprocessor 800 in combination with the machine-readable instructions. For example, the microprocessor 800 may be implemented by multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowcharts of FIGS. 5 and 6.

The cores 802 may communicate by a first example bus 804. In some examples, the first bus 804 may be implemented by a communication bus to effectuate communication associated with one(s) of the cores 802. For example, the first bus 804 may be implemented by at least one of an Inter-Integrated Circuit (I2C) bus, a Serial Peripheral Interface (SPI) bus, a PCI bus, or a PCIe bus. Additionally or alternatively, the first bus 804 may be implemented by any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2 cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the local memory 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating-point operations. In yet other examples, the AL circuitry 816 may include first AL circuitry that performs integer-based operations and second AL circuitry that performs floating-point operations. In some examples, the AL circuitry 816 may be referred to as an Arithmetic Logic Unit (ALU).

The registers 818 are semiconductor-based structures to store data and/or instructions such as results of one or more of the operations performed by the AL circuitry 816 of the corresponding core 802. For example, the registers 818 may include vector register(s), SIMD register(s), general-purpose register(s), flag register(s), segment register(s), machine-specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure, such as by being distributed throughout the core 802 to shorten access time. The second bus 822 may be implemented by at least one of an I2C bus, a SPI bus, a PCI bus, or a PCIe bus.

Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages.

The microprocessor 800 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 800, in the same chip package as the microprocessor 800 and/or in one or more separate packages from the microprocessor 800.

Figure 9:
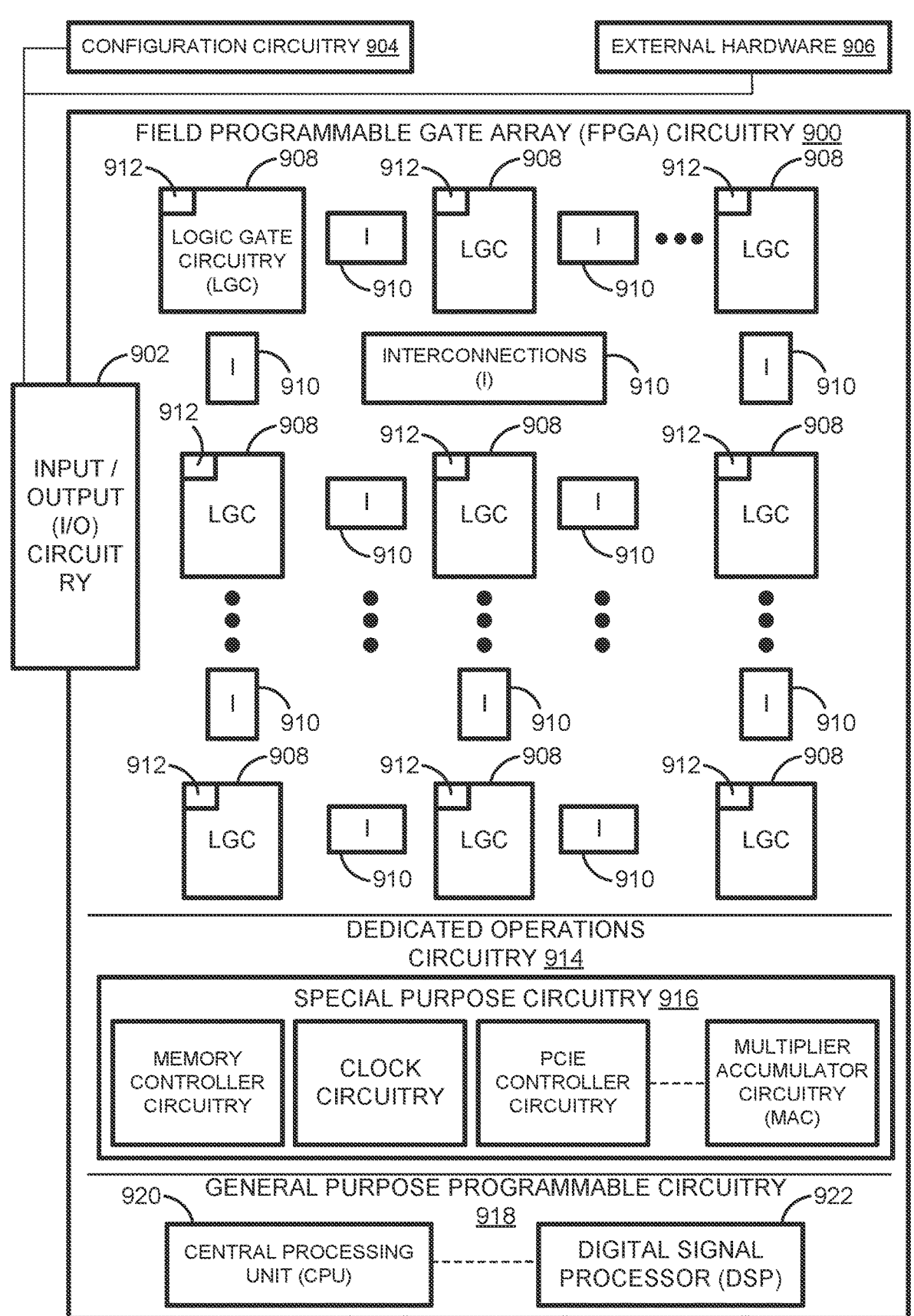
FIG. 9 is a block diagram of another example implementation of the programmable circuitry of FIG. 7.

FIG. 9 is a block diagram of another example implementation of the programmable circuitry 712 of FIG. 7. In this example, the programmable circuitry 712 is implemented by FPGA circuitry 900. For example, the FPGA circuitry 900 may be implemented by an FPGA. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 800 of FIG. 8 described above (which is a general purpose device that may be programmed to execute some or all of the machine readable instructions represented by the flowchart(s) of FIGS. 5 and 6 but whose interconnections and logic circuitry are fixed once fabricated), the FPGA circuitry 900 of the example of FIG. 9 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 5 and 6. In particular, the FPGA circuitry 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 5 and 6. As such, the FPGA circuitry 900 may be configured and/or structured to effectively instantiate some or all of the operations/functions corresponding to the machine readable instructions of the flowchart(s) of FIGS. 5 and 6 as dedicated logic circuits to perform the operations/functions corresponding to those software instructions in a dedicated manner analogous to an ASIC. Therefore, the FPGA circuitry 900 may perform the operations/functions corresponding to the some or all of the machine readable instructions of FIGS. 5 and 6 faster than the general-purpose microprocessor can execute the same.

In the example of FIG. 9, the FPGA circuitry 900 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 900 of FIG. 9 may access and/or load the binary file to cause the FPGA circuitry 900 of FIG. 9 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 900 of FIG. 9 to cause configuration and/or structuring of the FPGA circuitry 900 of FIG. 9, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 900 of FIG. 9 may access and/or load the binary file to cause the FPGA circuitry 900 of FIG. 9 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 900 of FIG. 9 to cause configuration and/or structuring of the FPGA circuitry 900 of FIG. 9, or portion(s) thereof.

The FPGA circuitry 900 of FIG. 9, includes example input/output (I/O) circuitry 902 to obtain and/or output data to/from example configuration circuitry 904 and/or external hardware 906. For example, the configuration circuitry 904 may be implemented by interface circuitry that may obtain a binary file, which may be implemented by a bit stream, data, and/or machine-readable instructions, to configure the FPGA circuitry 900, or portion(s) thereof. In some such examples, the configuration circuitry 904 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof. In some examples, the external hardware 906 may be implemented by external hardware circuitry. For example, the external hardware 906 may be implemented by the microprocessor 800 of FIG. 8.

The FPGA circuitry 900 also includes an array of example logic gate circuitry 908, a plurality of example configurable interconnections 910, and example storage circuitry 912. The logic gate circuitry 908 and the configurable interconnections 910 are configurable to instantiate one or more operations/functions that may correspond to at least some of the machine readable instructions of FIGS. 5 and 6 and/or other desired operations. The logic gate circuitry 908 shown in FIG. 9 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations/functions. The logic gate circuitry 908 may include other electrical structures such as look-up tables (LUTs), registers (e.g., flip-flops or latches), multiplexers, etc.

The configurable interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example dedicated operations circuitry 914. In this example, the dedicated operations circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the programmable circuitry 712 of FIG. 7, many other approaches are contemplated. For example, FPGA circuitry may include an on-board CPU, such as one or more of the example CPU 920 of FIG. 8. Therefore, the programmable circuitry 712 of FIG. 7 may additionally be implemented by combining at least the example microprocessor 800 of FIG. 8 and the example FPGA circuitry 900 of FIG. 9. In some such hybrid examples, one or more cores 802 of FIG. 8 may execute a first portion of the machine readable instructions represented by the flowchart(s) of FIGS. 5 and 6 to perform first operation(s)/function(s), the FPGA circuitry 900 of FIG. 9 may be configured and/or structured to perform second operation(s)/function(s) corresponding to a second portion of the machine readable instructions represented by the flowcharts of FIGS. 5 and 6, and/or an ASIC may be configured and/or structured to perform third operation(s)/function(s) corresponding to a third portion of the machine readable instructions represented by the flowcharts of FIGS. 5 and 6.

It should be understood that some or all of the circuitry of FIG. 2 may, thus, be instantiated at the same or different times. For example, same and/or different portion(s) of the microprocessor 800 of FIG. 8 may be programmed to execute portion(s) of machine-readable instructions at the same and/or different times. In some examples, same and/or different portion(s) of the FPGA circuitry 900 of FIG. 9 may be configured and/or structured to perform operations/functions corresponding to portion(s) of machine-readable instructions at the same and/or different times.

In some examples, some or all of the circuitry of FIG. 2 may be instantiated, for example, in one or more threads executing concurrently and/or in series. For example, the microprocessor 800 of FIG. 8 may execute machine readable instructions in one or more threads executing concurrently and/or in series. In some examples, the FPGA circuitry 900 of FIG. 9 may be configured and/or structured to carry out operations/functions concurrently and/or in series. Moreover, in some examples, some or all of the circuitry of FIG. 2 may be implemented within one or more virtual machines and/or containers executing on the microprocessor 800 of FIG. 8.

In some examples, the programmable circuitry 712 of FIG. 7 may be in one or more packages. For example, the microprocessor 800 of FIG. 8 and/or the FPGA circuitry 900 of FIG. 9 may be in one or more packages. In some examples, an XPU may be implemented by the programmable circuitry 712 of FIG. 7, which may be in one or more packages. For example, the XPU may include a CPU (e.g., the microprocessor 800 of FIG. 8, the CPU 920 of FIG. 9, etc.) in one package, a DSP (e.g., the DSP 922 of FIG. 9) in another package, a GPU in yet another package, and an FPGA (e.g., the FPGA circuitry 900 of FIG. 9) in still yet another package.

Figure 10:
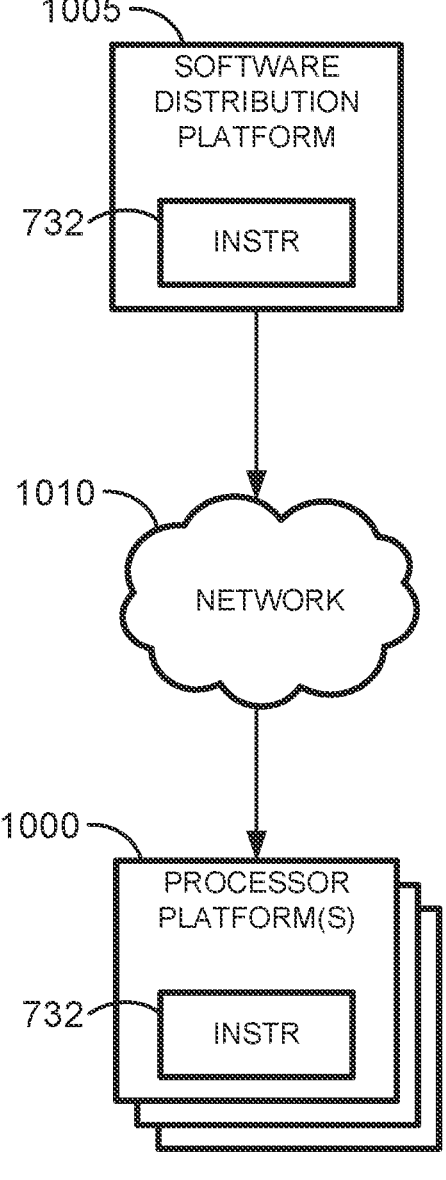
FIG. 10 is a block diagram of an example software/firmware/instructions distribution platform (e.g., one or more servers) to distribute software, instructions, and/or firmware (e.g., corresponding to the example machine readable instructions of FIGS. 5 and 6) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine readable instructions 732 of FIG. 7 to other hardware devices (e.g., hardware devices owned and/or operated by third parties from the owner and/or operator of the software distribution platform) is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine readable instructions 732 of FIG. 7. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the machine readable instructions 732, which may correspond to the example machine readable instructions of FIGS. 5 and 6, as described above. The one or more servers of the example software distribution platform 1005 are in communication with an example network 1010, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 732 from the software distribution platform 1005. For example, the software, which may correspond to the example machine readable instructions of FIGS. 5 and 6, may be downloaded to the example programmable circuitry platform 700, which is to execute the machine readable instructions 732 to implement the permissions controller circuitry 102. In some examples, one or more servers of the software distribution platform 1005 periodically offer, transmit, and/or force updates to the software (e.g., the example machine readable instructions 732 of FIG. 7) to ensure improvements, patches, updates, etc., are distributed and applied to the software at the end user devices. Although referred to as software above, the distributed "software" could alternatively be firmware.

From the foregoing, it will be appreciated that example systems, apparatus, articles of manufacture, and methods have been disclosed that verify user devices requesting access to an online resource. Disclosed systems, apparatus, articles of manufacture, and methods improve the efficiency of using a computing device by enabling secure transmissions of user credentials and confidential information between an end user and an online resource. Disclosed systems, apparatus, articles of manufacture, and methods are accordingly directed to one or more improvement(s) in the operation of a machine such as a computer or other electronic and/or mechanical device.

Example 1 includes an apparatus comprising interface circuitry, machine readable instructions, and programmable circuitry to at least one of instantiate or execute the machine readable instructions to access, via an application providing an online resource, a message requesting access to the online resource, the message including a device Internet Protocol (IP) address corresponding to a computing device transmitting the message, extract a log of IP addresses from a token generated by an authentication server, compare the device IP address to the log of IP addresses, and when the device IP address matches at least one of the IP addresses in the log, transmit the token to the application providing the online resource, the token authorizing the computing device to access the online resource.

Example 2 includes the apparatus of example 1, wherein the log of IP addresses includes a first reference IP address and a second reference IP address greater than the first IP address, and wherein the programmable circuitry is to transmit the token to the application when the device IP address is greater than the first reference IP address and less than the second reference IP address.

Example 3 includes the apparatus of example 1, wherein the log of IP addresses is defined using a Classless Inter-Domain Routing (CIDR) notation.

Example 4 includes the apparatus of example 1, wherein the token is to expire after a first time, and wherein the programmable circuitry is to compare the device IP address to the log of IP addresses at a second time subsequent to the first time.

Example 5 includes the apparatus of example 1, wherein the programmable circuitry is to limit the computing device from accessing the online resource when the device IP address does not match at least one of the IP addresses in the log.

Example 6 includes the apparatus of example 1, wherein the message is a Hypertext Transfer Protocol (HTTP) request and the application is a web browser.

Example 7 includes the apparatus of example 1, wherein the token is an Open Authorization (OAuth) access token.

Example 8 includes the apparatus of example 7, wherein the OAuth access token is generated by the authentication server in response to receipt of at least one credential from a user of the computing device.

Example 9 includes the apparatus of example 7, wherein the OAuth access token includes examples, at least one of the examples including the log of IP addresses.

Example 10 includes a non-transitory machine readable storage medium comprising instructions to cause programmable circuitry to at least access, via an application providing an online resource, a message requesting access to the online resource, the message including a device Internet Protocol (IP) address corresponding to a computing device transmitting the message, extract a log of IP addresses from a token generated by an authentication server, compare the device IP address to the log of IP addresses, and when the device IP address matches at least one of the IP addresses in the log, transmit the token to the application providing the online resource, the token authorizing the computing device to access the online resource.

Example 11 includes the non-transitory machine readable storage medium of example 10, wherein the log of IP addresses includes a first reference IP address and a second reference IP address greater than the first IP address, and wherein the instructions are to cause the programmable circuitry to transmit the token to the application when the device IP address is greater than the first reference IP address and less than the second reference IP address.

Example 12 includes the non-transitory machine readable storage medium of example 10, wherein the log of IP addresses is defined using a Classless Inter-Domain Routing (CIDR) notation.

Example 13 includes the non-transitory machine readable storage medium of example 10, wherein the token is to expire after a first time, and wherein the instructions are to cause the programmable circuitry to compare the device IP address to the log of IP addresses at a second time subsequent to the first time.

Example 14 includes the non-transitory machine readable storage medium of example 10, wherein the instructions are to cause the programmable circuitry to limit the computing device from accessing the online resource when the device IP address does not match at least one of the IP addresses in the log.

Example 15 includes the non-transitory machine readable storage medium of example 10, wherein the message is a Hypertext Transfer Protocol (HTTP) request and the application is a web browser.

Example 16 includes the non-transitory machine readable storage medium of example 10, wherein the token is an Open Authorization (OAuth) access token.

Example 17 includes the non-transitory machine readable storage medium of example 16, wherein the OAuth access token is generated by the authentication server in response to receipt of at least one credential from a user of the computing device.

Example 18 includes the non-transitory machine readable storage medium of example 16, wherein the OAuth access token includes examples, at least one of the examples including the log of IP addresses.

Example 19 includes a method comprising accessing, by executing an instruction with programmable circuitry, via an application providing an online resource, a message requesting access to the online resource, the message including a device Internet Protocol (IP) address corresponding to a computing device transmitting the message, extracting, by executing an instruction with the programmable circuitry, a log of IP addresses from a token generated by an authentication server, comparing, by executing an instruction with the programmable circuitry, the device IP address to the log of IP addresses, and when the device IP address matches at least one of the IP addresses in the log, transmitting, by executing an instruction with the programmable circuitry, the token to the application providing the online resource, the token authorizing the computing device to access the online resource.

Example 20 includes the method of example 19, wherein the log of IP addresses includes a first reference IP address and a second reference IP address greater than the first IP address, further including transmitting, by executing an instruction with the programmable circuitry, the token to the application when the device IP address is greater than the first reference IP address and less than the second reference IP address.

Example 21 includes the method of example 19, wherein the log of IP addresses is defined using a Classless Inter-Domain Routing (CIDR) notation.

Example 22 includes the method of example 19, wherein the token is to expire after a first time, further including comparing, by executing an instruction with the programmable circuitry, the device IP address to the log of IP addresses at a second time subsequent to the first time.

Example 23 includes the method of example 19, further including limiting, by executing an instruction with the programmable circuitry, the computing device from accessing the online resource when the device IP address does not match at least one of the IP addresses in the log.

Example 24 includes the method of example 19, wherein the message is a Hypertext Transfer Protocol (HTTP) request and the application is a web browser.

Example 25 includes the method of example 19, wherein the token is an Open Authorization (OAuth) access token.

Example 26 includes the method of example 25, wherein the OAuth access token is generated by the authentication server in response to receipt of at least one credential from a user of the computing device.

Example 27 includes the method of example 25, wherein the OAuth access token includes examples, at least one of the examples including the log of IP addresses.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
interface circuitry;
machine readable instructions; and
programmable circuitry to at least one of instantiate or execute the machine readable instructions to:
access, via an application providing an online resource, a message requesting access to the online resource, the message including a device Internet Protocol (IP) address corresponding to a computing device transmitting the message;
extract a log of IP addresses from a token generated by an authentication server, wherein the log of IP addresses extracted from the token includes a first reference IP address and a second reference IP address greater than the first IP address and is defined using a Classless Inter-Domain Routing (CIDR) notation;
compare the device IP address to the log of IP addresses; and
transmit the token to the application providing the online resource when the device IP address matches at least one of the IP addresses in the log and the device IP address is greater than the first reference IP address and less than the second reference IP address, the token authorizing the computing device to access the online resource.

2. The apparatus of claim 1, wherein the token is to expire after a first time, and wherein the programmable circuitry is to compare the device IP address to the log of IP addresses at a second time subsequent to the first time.

3. The apparatus of claim 1, wherein the programmable circuitry is to limit the computing device from accessing the online resource when the device IP address does not match at least one of the IP addresses in the log.

4. The apparatus of claim 1, wherein the message is a Hypertext Transfer Protocol (HTTP) request and the application is a web browser.

5. The apparatus of claim 1, wherein the token is an Open Authorization (OAuth) access token.

6. The apparatus of claim 5, wherein the OAuth access token is generated by the authentication server in response to receipt of at least one credential from a user of the computing device.

7. The apparatus of claim 5, wherein the OAuth access token includes claims, at least one of the claims including the log of IP addresses.

8. A non-transitory machine readable storage medium comprising instructions to cause programmable circuitry to at least:
access, via an application providing an online resource, a message requesting access to the online resource, the message including a device Internet Protocol (IP) address corresponding to a computing device transmitting the message;
extract a log of IP addresses from a token generated by an authentication server, wherein the log of IP addresses extracted from the token includes a first reference IP address and a second reference IP address greater than the first IP address and is defined using a Classless Inter-Domain Routing (CIDR) notation;
compare the device IP address to the log of IP addresses; and
transmit the token to the application providing the online resource when the device IP address matches at least one of the IP addresses in the log and the device IP address is greater than the first reference IP address and less than the second reference IP address, the token authorizing the computing device to access the online resource.

9. The non-transitory machine readable storage medium of claim 8, wherein the token is to expire after a first time, and wherein the instructions are to cause the programmable circuitry to compare the device IP address to the log of IP addresses at a second time subsequent to the first time.

10. The non-transitory machine readable storage medium of claim 8, wherein the instructions are to cause the programmable circuitry to limit the computing device from accessing the online resource when the device IP address does not match at least one of the IP addresses in the log.

11. The non-transitory machine readable storage medium of claim 8, wherein the token is an Open Authorization (OAuth) access token.

12. The non-transitory machine readable storage medium of claim 11, wherein the OAuth access token includes claims, at least one of the claims including the log of IP addresses.

13. A method comprising:

accessing, by executing an instruction with programmable circuitry, via an application providing an online resource, a message requesting access to the online resource, the message including a device Internet Protocol (IP) address corresponding to a computing device transmitting the message;

extracting, by executing an instruction with the programmable circuitry, a log of IP addresses from a token generated by an authentication server, wherein the log of IP addresses extracted from the token includes a first reference IP address and a second reference IP address greater than the first IP address and is defined using a Classless Inter-Domain Routing (CIDR) notation;

comparing, by executing an instruction with the programmable circuitry, the device IP address to the log of IP addresses; and transmitting, by executing an instruction with the programmable circuitry, the token to the application providing the online resource when the device IP address matches at least one of the IP addresses in the log and the device IP address is greater than the first reference IP address and less than the second reference IP address, the token authorizing the computing device to access the online resource.

14. The method of claim 13, further including limiting, by executing an instruction with the programmable circuitry, the computing device from accessing the online resource when the device IP address does not match at least one of the IP addresses in the log.

15. The method of claim 13, wherein the token is an Open Authorization (OAuth) access token.

* * * * *